(12) United States Patent
Mueller-Fischer et al.

(10) Patent No.: US 10,249,083 B2
(45) Date of Patent: Apr. 2, 2019

(54) STRAIN BASED DYNAMICS FOR RENDERING SPECIAL EFFECTS

(71) Applicant: NVIDIA Corporation, Santa Clara, CA (US)

(72) Inventors: Matthias Mueller-Fischer, Uerikon (CH); Nuttapong Chentanez, Bangkok (TH); Miles Macklin, Auckland (NZ)

(73) Assignee: NVIDIA CORPORATION, Santa Clara, CA (US)

( * ) Notice: Subject to any disclaimer, the term of this patent is extended or adjusted under 35 U.S.C. 154(b) by 107 days.

(21) Appl. No.: 15/015,007

(22) Filed: Feb. 3, 2016

(65) Prior Publication Data

US 2017/0221260 A1    Aug. 3, 2017

(51) Int. Cl.
*G06T 17/20*    (2006.01)
(52) U.S. Cl.
CPC ..........  *G06T 17/20* (2013.01); *G06T 2210/28* (2013.01)

(58) Field of Classification Search
CPC ......... G06T 15/00; G06T 15/10; G06T 17/00; G06T 17/20; G06T 19/00
USPC .......................................... 345/419, 420, 522
See application file for complete search history.

(56) References Cited

U.S. PATENT DOCUMENTS

| | | | | |
|---|---|---|---|---|
| 2002/0180739 | A1* | 12/2002 | Reynolds | G06F 17/30905 345/473 |
| 2002/0183992 | A1* | 12/2002 | Ayache | G06F 17/5018 703/2 |
| 2007/0239409 | A1* | 10/2007 | Alan | G06F 17/5018 703/2 |

* cited by examiner

*Primary Examiner* — Jacinta M Crawford

(57) ABSTRACT

A strain based dynamic technique, for rendering special effects, includes simulation as a function of a Green-St. Venant strain tensor constraint. The behavior of a soft body may be controlled independent of a mesh structure by assigning different stiffness values to each constraint of the Green-St. Venant strain tensor.

15 Claims, 3 Drawing Sheets

STRAIN BASED DYNAMICS FOR RENDERING SPECIAL EFFECTS

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, smart phones, game consoles, servers, and the like have facilitated increased productivity and reduced costs in communicating and analyzing data in most areas of entertainment, education, business, and science. One common aspect of computing devices is the rendering of images on a display that includes a number of visual effects.

Position based dynamics is a common method to simulate deformable objects in rendered images because it is relatively fast, robust and simple to implement. Distance constraints along mesh edges are typically used, which makes the behavior of an object dependent on the mesh structure. This can yield artifacts and does not allow the control of stretch modes independent of irregular mesh structures. Accordingly, there is a continued need for improved computing device based image rendering.

SUMMARY OF THE INVENTION

The present technology may best be understood by referring to the following description and accompanying drawings that are used to illustrate embodiments of the present technology directed toward strain based position based dynamics. In general, position based dynamics (PBD) provide a mechanism for simulating dynamics by solving a system of non-linear constraints based upon updating particle positions directly.

In accordance with embodiments of the present technology, a method for rendering images includes position based dynamic (PBD) simulation of a visual effect as a function of a Green-St. Venant strain tensor constraint in response to the received commands and data. The constraints of the Green-St. Venant strain tensor drive adjacent particles toward one or more configurations for which the coefficients assume given values. The diagonal constraint of the Green-St. Venant strain tensor constraint may be modified such that the Green-St. Venant strain tensor constraint can be solved in a single step. The behavior of a soft body may be controlled independent of the mesh tessellation structure utilized by assigning different stiffness values to each constraint of the Green-St. Venant strain tensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
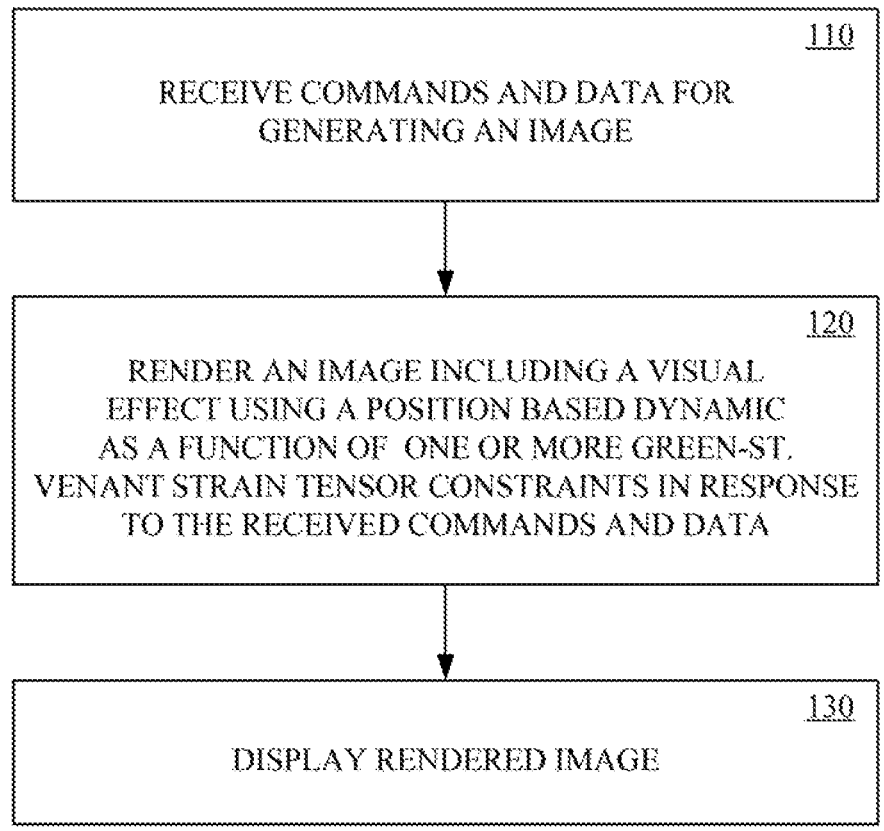
FIG. 1 shows a flow diagram of a method of generating images on a computing device, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a method of generating images on a computing device, in accordance with one embodiment of the present technology, is shown. The method begins with receipt of one or more commands and data for generating an image, at 110. At 120, the image, including a visual effect, is rendered in response to the received commands and data, at 110. The visual effect is simulated using a position based dynamics (PBD) framework as a function of one or more Green-St. Venant strain tensor constraints. At 130, the rendered image is displayed.

Figure 2:
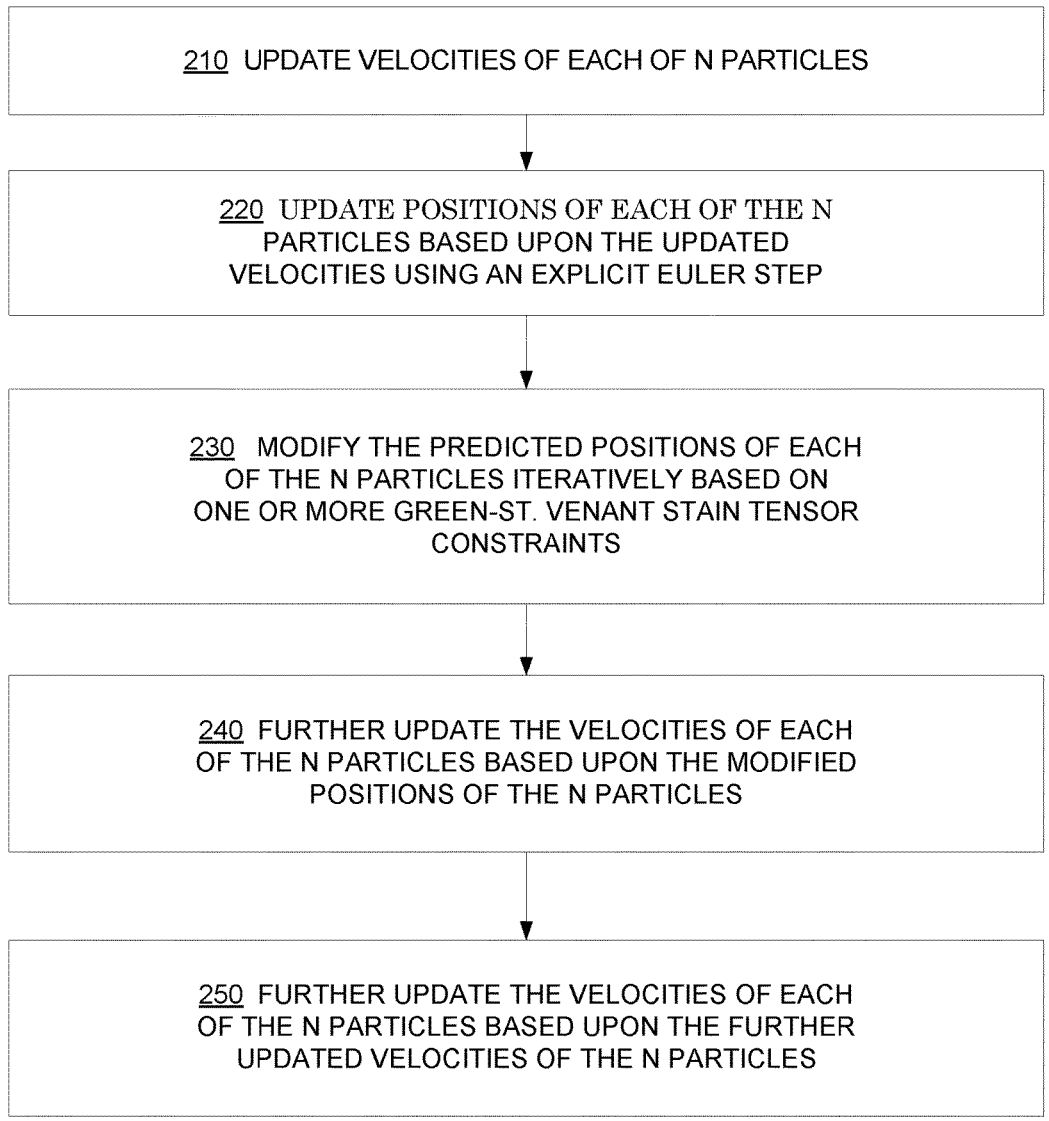
FIG. 2 shows a flow diagram of a method of rendering an image including a visual effecting using position based dynamic (PBD) as a function of one or more Green-St. Venant strain tensors constraints, in accordance with one embodiment of the present technology.

Referring now to FIG. 2, a method of rendering an image including a visual effecting using PDB as a function of one or more Green-St. Venant strain tensors constraints, in accordance with one embodiment of the present technology, is shown. Simulating the visual effect includes updating velocities of each of N particles, at 210. Assuming N particles with positions $x_i$, velocities $v_i$ and inverse masses $w_i$, in one implementation the velocities may be updated according to $v_i \leftarrow v_i + \Delta t f_i$. At 220, positions of each of the N particles are updated based upon the updated velocities using an explicit Euler step. In one implementation the positions may be updated according to $p_i \leftarrow x_i + \Delta t v_i$. At 230, the predicted positions of each of the N particles are iteratively modified using a solver to meet a set of positional constrains based on the one or more Green-St. Venant strain tensor constraints. In one implementation, the predicted positions may be modified according to $p_i \leftarrow$ solve $(p_i)$ to such that the entries of Green St. Venant strain tensor, induced by the deformable particle positions, are constrained. At 240, the velocities of each of the N particles are further updated based upon the modified positions. In one implementation, the velocities are further updated according to $v_i \leftarrow (p_i - x_i)/\Delta t$. At 250, the positions of each of the N particles are further updated based upon the further updated velocities. In one implementation, the positions are further updated according to $x_i \leftarrow p_i$.

For triangle and tetrahedral mesh structures, the PBD constraints are derived from Green-St. Venant strain tensor, at 230. Each entry of the strain tensor yields a different constraint. These constraints drive all adjacent particles toward configurations for which the strain tensor coefficients assume given values. By assigning different stiffness values to each constraint, the behavior of cloth and other soft bodies can be controlled independent of the mesh structure.

Considering a single tetrahedron first, one can derive constraints that involve all four particles and drive the configuration to a state in which the components of the Green-St. Venant strain tensor assume given values. To formulate these constrains, the expressions of the strain components in terms of the positions of the four particles adjacent to the tetrahedron are needed. Accordingly, let $q_0$, $q_1$, $q_2$, $q_3$ be their material positions, and $p_0$, $p_1$, $p_2$, $p_3$ the corresponding world positions. Since translation does not contribute to strain we can assume that $q_0$ and $p_0$ are zero. Then, with $$P = [p_1, p_2, p_3] \text{ and} \tag{1}$$

$$Q = [q_1, q_2, q_3] \tag{2}$$

one can express the deformation gradient as $$F = PQ^{-1} \tag{3}$$

and the Green-St. Venant strain tensor as $$G = F^T F - 1 \tag{4}$$

where I is the identity matrix. The factor ½ has been dropped in the original definition of Green-St. Venant strain tensor because it cancels out in the constrain formulation. The matrix $Q^{-1}$ is constant and can be precomputed.

The diagonal entries of $G_{ii}$ represents stretch and the off-diagonal entries $G_{ij} = G_{ji}$ shear both with respect to the main axes in the material frame. One may now introduce the three stretch and shear constraint functions $$C(p_0, p_1, p_2, p_3) = S_{ii} - s_i^2 \tag{5}$$

$$C(p_0, p_1, p_2, p_3) = S_{ij} \; i < j, \tag{6}$$

where $S = F^T F$ and $s_i$ rest stretches, typically equal to 1. These constraints pull the particles toward states of zero stretch and zero shear. Associating separate stiffness coefficients $k_{ij}$ with each constraint lets one simulate anisotropic material. Note that no rotation matrices have to be estimated via polar decomposition, as in most strain limiting methods, because rotational independence is built into the definition of Green-St. Venant strain tensor.

Although these are natural definitions of the constraint functions, there is a more stable way to formulate the stretch constraints in equation 5. To see this, one may have a look at simple distance constraints with rest length d between two points. The two constraint functions $$C(p_1, p_2) = |p_1 - p_2| - d \tag{7}$$

$$C(p_1, p_2) = |p_1 - p_2|^2 - d^2 \tag{8}$$

are both valid, However, the first function is linear along $p_1 - p_2$ while the second is not. This means that the linearizing constraint projection of PBD can solve the first constraint in one step. This is not true for the second constraint function which corresponds to the above measure of stretch. The problem can easily be fixed by replacing equation 5 by $$C(p_0, p_1, p_2, p_3) = \sqrt{S_{ii}} - s_i \tag{9}$$

With this modification, the stretch constraints are solved correctly with a single projections step. Furthermore, in experiments, this modification reduced the relative remaining stretch with the same number of solver iterations by 25% on average.

More particularly, in deriving the strain based constraints, let $c_i$ be the columns of $Q^{-1}$ and $f_i$ be the columns of F as follows $$[c_1, c_2] = Q^{-1} \tag{10}$$

$$[f_1, f_2] = F \tag{11}$$

and $$[c_1, c_2, c_3] = Q^{-1} \tag{12}$$

$$[f_1, f_2, f_3] = F \tag{13}$$

for triangles and tetrahedral, respectively. Then the entries of S can be computed as $$S_{ij} = f_i f_j = (Pc_i)(Pc_j) \tag{14}$$

where i, $j \in \{1, 2\}$ for triangles and i, $j \in \{1, 2, 3\}$ for tetrahedral. The derivatives of the components of S with respect to the particle positions, needed in the PBD approach are $$\nabla S_{ij} = [\nabla p_1, \nabla p_2] S_{ij} = f_j e_i^T f_i e_j^T \tag{15}$$

$$\nabla S_{ij} = [\nabla p_1, \nabla p_2, \nabla p_3] S_{ij} = f_j e_i^T f_i e_j^T \tag{16}$$

for triangles and tetrahedral respectively and $$\nabla_{p_0} S_{ij} = -\Sigma_{k=1}^{d} \nabla_{p_k} S_{ij} \quad (17)$$

where d=2 for triangles and d=3 for tetrahedral. The particle projection vectors with respect to $S_{ij}$ may be determined as $$\Delta p_k = -\lambda w_k \nabla_{p_k} S_{ij} \quad (18)$$

where $w_k$ is the inverse mass of particle k and $$\lambda = \frac{S_{ij} - s_i^2}{\Sigma_k w_k |\nabla_{p_k} S_{ij}|^2} \quad (19)$$

$$\lambda = \frac{S_{ij}}{\Sigma_k w_k |\nabla_{p_k} S_{ij}|^2} \quad (20)$$

$$\lambda = 2 \frac{\sqrt{S_{ij}} - s_i}{\Sigma_k w_k |\nabla_{p_k} S_{ij}|^2} \sqrt{S_{ij}} \quad (21)$$

for equations 5, 6 and 9 respectively.

The texture coordinates $u_i = (u_i, v_i)$ of the triangle vertices cannot be used directly as material coordinates for the rest state because they might contain stretch. To compute the material coordinates $q_0$, $q_1$, and $q_2 \in \mathbb{R}^2$ one needs an orthonormal local frame.

Let the rest positions of the vertices of the triangle in world space be $x_0$, $x_1$, $x_2 \in \mathbb{R}^3$. On can compute two world space tangential vectors $t_u$ and $t_v \in \mathbb{R}^3$ along the u and v axes as $$(t_u, t_v) = (x_1 - x_0, x_2 - x_0)(u_1 - U_0, u_2 - u_0)^{-1} \quad (22)$$

these tangents give one the local frame to transform the global positions into material coordinates as $$(c_1, c_2) = [n_1, n_2]^T (x_1 - x_0, x_2 - x_0) \quad (23)$$

where $$n_1 = \frac{t_u}{|t_u|} \text{ and } n_1 = \frac{t_v}{|t_v|}.$$

To make sure $t_u$ and $t_u$ are normal to each other, the latter can alternatively be computed as the cross product of $t_u$ with the triangle normal.

Equations 5 and 6 constrain strain along the global coordinate axes. In certain cases, this is not desirable. Assuming a tetrahedral layer on the surface of a character for simulating skin, it may be desired to have the skin slide easily tangentially to the surface but not normal to it. There is a simple solution to this problem. One does not even have to modify the formulation. All that is needed is to modify the rest shape of the tetrahedral. As a pre-computation step, a local frame is computed for each tetrahedron. In the example above, this frame would be spawned by the tangent and normal vector of the surface at the location of the tetrahedron. The constant rest positions $q_0$, $q_1$, $q_2$ and $q_3$ are then simply stored with respect to this local frame.

For triangles the corresponding matrices P and Q are not square because the number of particles is reduced by one, but the dimensionality of the particle positions stays the same so $Q^{-1}$ is not defined. The problem can be solved by the natural choice of defining the rest state of the triangles via two dimensional texture coordinates on the triangle mesh. To properly simulate anisotropic cloth behavior, the texture coordinates are aligned with the weft and warp directions of the cloth. Now Q becomes a 2×2 dimensional matrix and $Q^{-1}$ is well defined. The definition $$S = Q^{-1T} P^T P Q^{-1} \quad (24)$$

is valid too with S, $Q \in \mathbb{R}^{2 \times 2}$ and $P \in \mathbb{R}^{2 \times 3}$.

None of the constraints above control the volume of tetrahedral or areas of triangles by their own. However, if all constraints are satisfied at the same time, one has G=I and, thus, |F|=1 (i.e., conservation of volume). Often it is important to control volume conservation separately though. It allows the simulation of soft material with strong volume conservation for instance. Adding a separate volume/area conservation constraint is straight forward in the PDB framework. One simply defines $$C_{volume}(p_0, p_1, p_2, p_3) = |F| - 1 \text{ and} \quad (25)$$

$$C_{area}(p_0, p_1, p_2) = |F| - 1 \quad (26)$$

for 3d solids and 2d cloth, respectively. To be compatible with rest stretches other than one, these formulas need to be generalized to $$C_{volume}(p_0, p_1, p_2, p_3) = |F| - s_1 s_2 s_3 \text{ and} \quad (27)$$

$$C_{area}(p_0, p_1, p_2) = |F| - s_1 s_2. \quad (28)$$

Another important feature of this constraint is that it handles element inversion for tetrahedral, since $$|F| = 1 \quad (29)$$

$$|P||Q^{-1}| = 1 \quad (30)$$

$$|P| = |Q| \quad (31)$$

states that the signed volume of the tetrahedron must match is signed rest volume. An explicit formula for this constraint shows that, in case of volume inversion, vertices are protected across the base face to the correct side. In particular, from equation 31, $$c_v(p_1, p_2, p_3) = |F| - 1 \quad (32)$$

$$= |P| - |Q| \quad (33)$$

$$= p_1^T(p_2 \times p_3) - q_1^T(q_2 \times q_3) \quad (34)$$

and its derivatives $$\nabla_{p_1} C_{volume} = p_2 \times p_3 \quad (35)$$

$$\nabla_{p_2} C_{volume} = p_3 \times p_1 \quad (36)$$

$$\nabla_{p_3} C_{volume} = p_1 \times p_2 \quad (37)$$

$$\nabla_{p_0} C_{volume} = -p_2 \times p_3 - p_3 \times p_1 - p_1 \times p_2. \quad (38)$$

Similarly, one can derive a constraint for preservation of triangle area as $$C_{area}(p_1, p_1) = |p_1 \times p_2|^2 - |q_1 \times q_2|^2 \quad (39)$$

Its derivatives are $$\nabla_{p_1} C_{volume} = 2p_2 \times (p_1 \times p_2) \quad (40)$$

$$\nabla_{p_2} C_{volume} = 2p_1 \times (p_2 \times p_1) \quad (41)$$

$$\nabla_{p_0} C_{volume} = -2p_2 \times (p_1 \times p_2) - 2p_1 \times (p_2 \times p_1) \quad (42)$$

with the corresponding particle projection vectors $$\Delta p_k = -\lambda w_k \nabla_{p_k} C_{volume(area)} \quad (43)$$

where $$\lambda = C_{volume(area)} / \Sigma_k w_k |\nabla_{p_k} C_{volume(area)}|^2. \quad (44)$$

In the case of cloth simulation, since strain is an intrinsic measure, the strain based constraints do not influence bending which is an extrinsic quantity. Therefore, bending needs to be handled separately as well.

To simulate bending resistance, the dihedral angle of pairs of adjacent triangles may be constrained. However, simplified formulas for the derivatives of the dihedral angle with respect to the particle positions, namely the bending mode of a pair of triangles, may be used. This mode corresponds one to one to the derivatives of the bending angle including scaling. Only the sign has to be flipped dependent on the orientation of the triangle pair as follows. Let $p_1$, $p_2$, $p_3$ and $p_4$ be the particles of a bending element consisting of the two triangles ($p_1$, $p_3$, $p_4$) and ($p_2$, $p_4$, $p_3$). The bending angle $\phi$ can be computed via the two triangle normals as $$\phi = \arccos\left(\frac{(p_3 - p_1) \times (p_4 - p_1)}{|(p_3 - p_1) \times (p_4 - p_1)|} \frac{(p_4 - p_2) \times (p_3 - p_2)}{|(p_4 - p_2) \times (p_3 - p_2)|}\right) \quad (45)$$

The spatial derivatives correspond to the bending mode and are $$\nabla_{p_1} \phi = |e| n_1 \quad (46)$$

$$\nabla_{p_2} \phi = |e| n_2 \quad (47)$$

$$\nabla_{p_3} \phi = \frac{(p_1 - p_4) e}{|e|} n_1 + \frac{(p_2 - p_4) e}{|e|} n_2 \quad (48)$$

$$\nabla_{p_4} \phi = \frac{(p_3 - p_1) e}{|e|} n_1 + \frac{(p_3 - p_2) e}{|e|} n_2 \quad (49)$$

where $$e = p_4 - p_3 \quad (50)$$

$$n_1 = \frac{(p_3 - p_1) \times (p_4 - p_1)}{|(p_3 - p_1) \times (p_4 - p_1)|^2} \quad (51)$$

$$n_1 = \frac{(p_3 - p_1) \times (p_4 - p_1)}{|(p_3 - p_1) \times (p_4 - p_1)|^2} \quad (52)$$

The signs of all the derivatives have to be flipped if $(n_1 \times n_2) e > 0$.

For damping one can use a general PBD formulation that specifically damps the relative velocities with respect to a constraint with positional correction $\Delta p_1, \ldots, \Delta p_N$ as $$v_i \leftarrow v_i - k(\Sigma_{j=1}^N v_j^T n_j) n_i \quad (53)$$

where $k \in [0, 1]$ is the corresponding stiffness and $$n_i = \frac{\Delta p_i}{|\Delta p_i|}.$$

Note that the term $\Sigma_{j=1}^N v_j^T n_j$ makes sure that damping is only applied to a given mode $n_j$, without adding any artificial damping to rigid body motion as the sum cancels out when the mode itself does not change.

Figure 3:
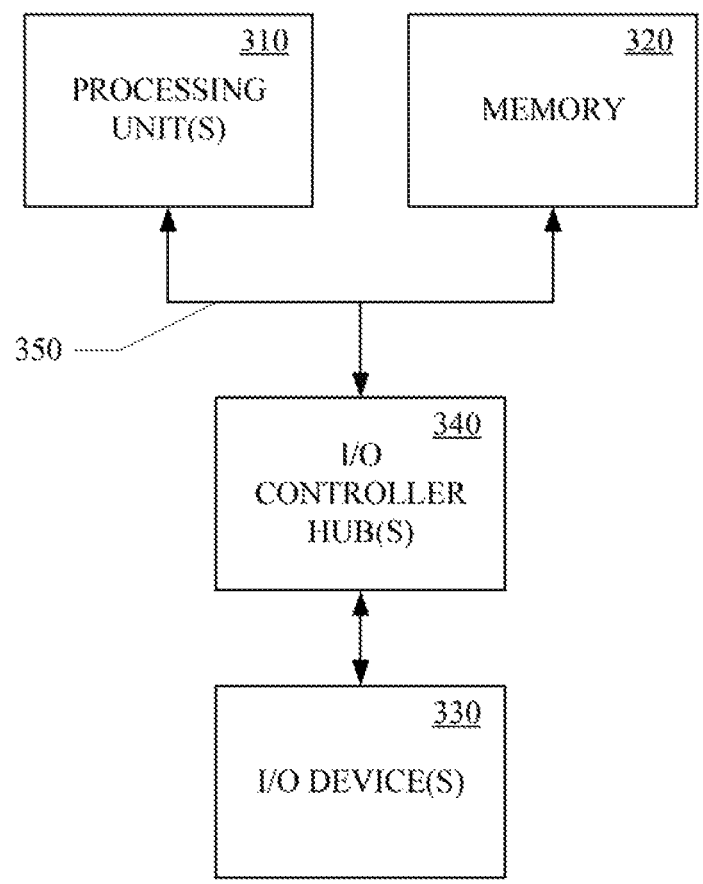
FIG. 3 shows a block diagram of an exemplary computing device for implementing embodiments of the present technology.

Referring now to FIG. 3, an exemplary computing device for implementing embodiments of the present technology, is shown. The exemplary computing device 300 may be a personal computer, laptop computer, tablet computer, smart phone, game console, server computer, client computer, distributed computer system, or the like. The exemplary computing device 300 includes one or more processing units 310, one or more computing device-readable media 320 and one or more input/output (I/O) devices 330 communicatively coupled together by one or more I/O controller hubs 340 and/or buses 350. The one or more processing units may include one or more central processing units (CPUs), one or more graphics processing units (GPUs), and/or the like. The one or more computing device-readable media may include one or more types of primary and/or secondary memory, non-volatile and/or volatile memory, system, graphics and/or unified memory, and/or the like, including solid state random access memory (RAM), read only memory (ROM), flash memory, magnetic disks, optical storage and/or the like. The I/O devices may include a network adapter (e.g., Ethernet card, WiFi card), DVD drive, keyboard, pointing device (e.g., mouse), game controller, display, speaker, printer, and/or the like. The I/O controller hubs and/or buses are adapted for communicating data and instructions between the processing units, computing device-readable media, and I/O devices. The buses may include one or more types of serial and/or parallel buses, such as Peripheral Component Interconnect Express (PCIe), Universal Serial Bus (USB), and/or the like.

One or more processing units 310 are adapted to generate images in accordance with embodiments of the present technology. The method may be implemented on the one or more processing units 310 by hardware, firmware, software (e.g., computing device-executable instructions that are stored in one or more computing device-readable media 320 and executed by the one or more processing units 310), or any combination thereof. In one implementation, one or more graphics processing units and/or one or more cores of a graphics process unit are adapted to rendering an image including a visual effect, wherein the visual effect is simulated using a position based dynamics (PBD) framework as a function of one or more Green-St. Venant strain tensor constraints. The rendered image is then output on a display 330 of the computing device 300.

Strain based PBD techniques in accordance with embodiments of the present technology advantageously provide fast, robust and simple techniques to simulate deformable objects. The techniques are advantageously applied to render special effects in computing device generated images for gaming, animation and the like. By avoiding forces and deriving momentum changes implicitly from the position updates, the typical instabilities associated with explicit methods can be avoided.

Embodiments advantageously make the behavior independent of the tessellation of mesh structure. Varying the stiffness values corresponding to the individual strain coefficients advantageously enables simulation of anisotropic behavior. In addition, the constraints corresponding to the diagonal entries of the strain tensor may advantageously be modified to solve for the constraints in a single step.

Embodiments of the strain based dynamic techniques advantageously makes the behavior independent of the tessellation. The strain based dynamic techniques also allows the control of shear strain and normal strain independently. The strain based technique yields higher x-factors and can be executed faster on conventional GPUs than the distance based approach, due in part to less communication.

Embodiments advantageously allows the control of shear and normal strain independently. In cloth simulations and the like, the techniques advantageously allow for the control of stiffness along warp and weft directions for instance.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
receiving commands and data for generating an image;
rendering the image, by a graphics processing unit (GPU), including a visual effect in response to the received commands and data, wherein the visual effect is simulated using a position based dynamics (PBD) framework as a function of one or more Green Saint-Venant (Green-St. Venant) strain tensor constraints; and
displaying the image.

2. The method according to claim 1, wherein simulating the visual effect comprises:
updating velocities of each of N particles;
updating positions of each of the N particles based upon the updated velocities using an explicit Euler step;
modifying the predicted positions of each of the N particles iteratively using a solver to meet a set of positional constrains based on the one or more Green-St. Venant strain tensor constraints
further updating velocities of each of the N particles based upon the modified positions; and
further updating the positions of each of the N particles based upon the further updated velocities.

3. The method according to claim 1, wherein a diagonal constraint, of the one or more Green-St. Venant strain tensor constraints, is modified such that the one or more Green-St. Venant strain tensor constraints can be solved in a single step.

4. The method according to claim 1, wherein a stiffness coefficient of the one or more Green-St. Venant strain tensor are constrained.

5. The method according to claim 1, wherein the constraints of the Green-St. Venant strain tensor drive adjacent particles toward one or more configurations for which the coefficients assume given values.

6. The method according to claim 1, wherein the behavior of a soft body is controlled independent of a mesh structure by assigning different stiffness values to each constraint of the Green-St. Venant strain tensor.

7. The method according to claim 6, wherein the mesh structure comprises a tetrahedral mesh.

8. The method according to claim 6, wherein the mesh structure comprises a triangle mesh.

9. The method according to claim 1, wherein a different stiffness value is assigned to each of two or more of the Green-St. Venant strain tensor constraints.

10. One or more non-transitory computing device readable media storing computing device executable instructions that when executed by one or more processing units performs a method comprising:
receiving commands and data for generating an image;
rendering the image, by a graphics processing unit (GPU), including a position based dynamic simulation of a visual effect as a function of a Green Saint Venant (Green-St. Venant) strain tensor constraint in response to the received commands and data; and
displaying the image.

11. The one or more non-transitory computing device readable media storing computing device executable instructions that when executed by one or more processing units performs the method of claim 10, wherein the position based dynamic simulation uses a triangle mesh tessellation structure.

12. The one or more non-transitory computing device readable media storing computing device executable instructions that when executed by one or more processing units performs the method of claim 10, wherein the position based dynamic simulation uses a tetrahedral mesh tessellation structure.

13. The one or more non-transitory computing device readable media storing computing device executable instructions that when executed by one or more processing units performs the method of claim 10, wherein the constraints of the Green-St. Venant strain tensor drive adjacent particles toward one or more configurations for which the coefficients assume given values.

14. The one or more non-transitory computing device readable media storing computing device executable instructions that when executed by one or more processing units performs the method of claim 13, wherein a stiffness coefficient of the Green-St. Venant strain tensor is constrained.

15. The one or more non-transitory computing device readable media storing computing device executable instructions that when executed by one or more processing units performs the method of claim 13, wherein a diagonal constraint of the Green-St. Venant strain tensor constraint is modified such that the Green-St. Venant strain tensor constraint can be solved in a single step.

* * * * *